United States Patent
Yeung et al.

(10) Patent No.: US 9,100,203 B2
(45) Date of Patent: Aug. 4, 2015

(54) IP MULTICAST OVER MULTI-CHASSIS TRUNK

(75) Inventors: Wing-Keung Adam Yeung, Pleasanton, CA (US); Ajeer Salil Pudiyapura, Sunnyvale, CA (US); Ganesan Velrajan, Santa Clara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 221 days.

(21) Appl. No.: 13/556,061

(22) Filed: Jul. 23, 2012

(65) Prior Publication Data

US 2013/0182581 A1 Jul. 18, 2013

Related U.S. Application Data

(60) Provisional application No. 61/585,729, filed on Jan. 12, 2012.

(51) Int. Cl.
*H04L 12/18* (2006.01)
(52) U.S. Cl.
CPC .................................. *H04L 12/1877* (2013.01)
(58) Field of Classification Search
None
See application file for complete search history.

(56) References Cited

U.S. PATENT DOCUMENTS

| 8,204,061 | B1* | 6/2012 | Sane et al. | 370/397 |
| 2009/0161670 | A1* | 6/2009 | Shepherd et al. | 370/389 |
| 2010/0195529 | A1* | 8/2010 | Liu et al. | 370/252 |
| 2011/0194403 | A1* | 8/2011 | Sajassi et al. | 370/217 |
| 2013/0028072 | A1* | 1/2013 | Addanki | 370/218 |

* cited by examiner

*Primary Examiner* — Awet Haile
(74) *Attorney, Agent, or Firm* — Shun Yao; Park, Vaughan, Fleming & Dowler LLP

(57) ABSTRACT

In embodiments of the present invention, multicast traffic is simultaneously routed via all switches participating in the trunk (can be referred to as partner switches). A respective partner switch synchronizes the local multicast state information with all other partner switches. For a respective multicast group, a plurality of partner switches can be the part of the corresponding multicast distribution tree and obtain multicast traffic from uplink sources. For the multicast group, only one partner switch is elected as the primary forwarder which forwards the multicast traffic via the trunk. Another partner switch can become the primary forwarder for the multicast traffic of another multicast group and provide load sharing of multicast traffic between partner switches. Furthermore, because the partner switches have the multicast traffic and state readily available, in the event of a switch or link failure to the primary forwarder, another partner switch can readily become the primary forwarder.

21 Claims, 11 Drawing Sheets

IP MULTICAST OVER MULTI-CHASSIS TRUNK

RELATED APPLICATIONS

This application claims the benefit of U.S. Provisional Application No. 61/585,729, titled "Optimizing Multicast Routing Over Multi-Chassis Trunk," by inventors Wing-Keung Adam Yeung, Ajeer Salil Pudiyapura, and Ganesan Velrajan, filed 12 Jan. 2012, the disclosure of which is incorporated by reference herein.

The present disclosure is related to U.S. patent application Ser. No. 12/730,749, titled "Method and System for Extending Routing Domain to Non-Routing End Stations," by inventors Pankaj K. Jha and Mitri Halabi, filed 24 Mar. 2010, the disclosure of which is incorporated by reference herein.

BACKGROUND

1. Field

The present disclosure relates to network management. More specifically, the present disclosure relates to a method and system for efficiently managing multicast routing over multi-chassis trunks.

2. Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

As more time-critical applications are being implemented in data communication networks, high-availability operation is becoming progressively more important as a value proposition for network architects. It is often desirable to aggregate links to multiple switches to operate as a single logical link (referred to as a multi-chassis trunk) to facilitate load balancing among the multiple switches while providing redundancy to ensure that a device failure or link failure would not affect the data flow.

Currently, such multi-chassis trunks in a network have not been able to take advantage of the multicast functionalities available in a typical switch. Individual switches in a network are equipped to manage multicast traffic but are constrained while operating in conjunction with each other for providing a multi-chassis trunk. Consequently, an end device coupled to multiple switches via a multi-chassis trunk typically exchanges all the multicast data with only one of the switches. If the switch fails, another partner switch can forward multicast data traffic to the end device only after the partner switch becomes part of the multicast distribution process. As a result, the failure recovery becomes inefficient. Furthermore, other routing devices in the network can send data to that end station only via one of the switches to which the end station is coupled.

While multi-chassis trunk brings many desirable features to networks, some issues remain unsolved in multicast routing.

SUMMARY

One embodiment of the present invention provides a switch. The switch includes a link management module, a packet processor, a forwarding management module, and a multicast group management module. The link management module operates a local interface of the switch in conjunction with a remote switch to form a multi-chassis trunk link. The packet processor identifies a join request for a multicast group based on a control message associated with the remote switch. The forwarding management module determines whether the switch is a primary forwarder for the multicast group. The multicast group management module operates in conjunction with the packet processor to construct a join packet for receiving data associated with the multicast group.

In a variation on this embodiment, the multicast group management module operates in conjunction with the packet processor to extract multicast data associated with the multicast group from a received packet.

In a variation on this embodiment, the multicast group management module operates in conjunction with the packet processor to construct a control message for the remote switch containing local multicast state information In a variation on this embodiment, the forwarding management module determines whether the switch is the primary forwarder based on a hash value calculated using an identifier of the multicast group.

In a variation on this embodiment, the forwarding management module precludes the local interface from forwarding multicast data associated with the multicast group in response to the switch not being the primary forwarder.

In a variation on this embodiment, the link management module detects a failure of the remote switch; and the forwarding management module instructs the local interface to forward multicast data associated with the multicast group in response to detecting the failure In a variation on this embodiment, the switch and the remote switch are members of an Ethernet fabric switch; and the switch and the remote switch are associated with an identifier of the Ethernet fabric switch.

In a variation on this embodiment, the packet processor extracts packets encapsulated in a Transparent Interconnection of Lots of Links (TRILL) header.

DETAILED DESCRIPTION

Figure 1A:
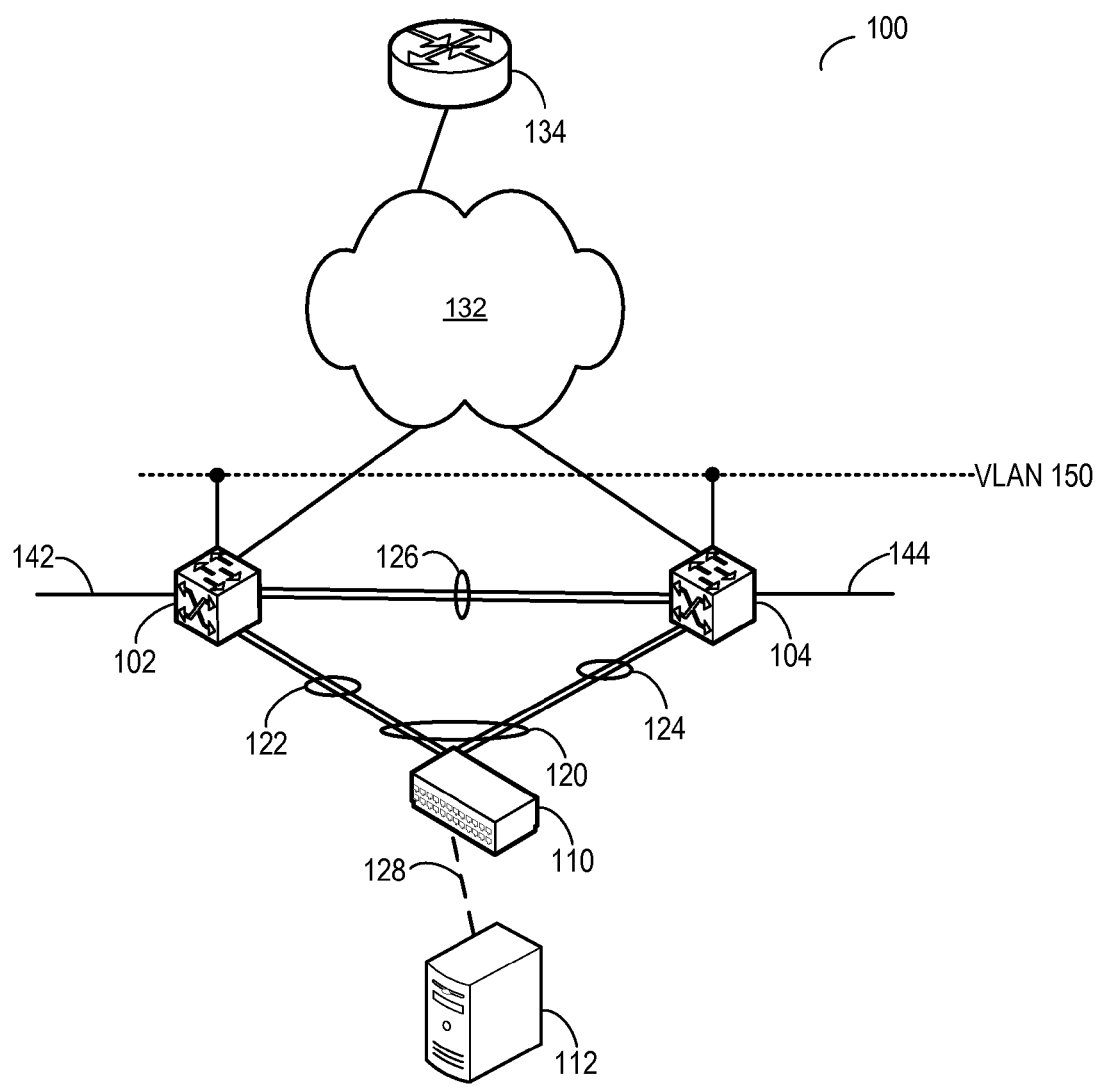
FIG. 1A illustrates an exemplary multi-chassis trunk, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of routing multicast traffic over a multi-chassis trunk is solved by simultaneously routing the multicast traffic via all switches participating in the trunk. The switches exchanges control messages containing multicast information to synchronize their multicast routing states, provide high availability, and facilitate load balancing. Multicast traffic for a specific multicast group is usually distributed over a multicast distribution tree. An end device expresses an interest to receive traffic from a multicast group by sending a join request via a multicast management protocol. In a local area network (LAN), usually one switch, which can be referred to as a designated router, becomes part of the multicast distribution tree upon receiving a join request from an end device and is responsible for distribution of multicast traffic of the group in that LAN.

In some embodiments, the switches participating in a multi-chassis trunk (referred to as partner switches) are part of the same LAN (and VLAN). Consequently, only one of the switches usually becomes the designated forwarder. However, that switch is then a single point of failure. If this switch fails, another partner switch becomes the designated router, joins the distribution tree, and forwards multicast data traffic to the end device. As a result, the failure recovery becomes inefficient. Furthermore, the end device can send the join request for the multicast group via any of the links in the trunk. As the trunk is distributed across multiple switches (i.e., chassis), the end device may send the join request for a group to a partner switch other than the designated router. Consequently, the join request may not reach the partner switch acting as the designated router. The designated router then may not join the multicast group and forward multicast data traffic.

To solve this problem, the switch which receives the join request for a multicast group from an end device via the trunk forwards the join request to all other partner switches of the trunk. As a result, a respective switch of the trunk can join the multicast distribution tree and receive the corresponding multicast traffic simultaneously. One partner switch can be elected to forward the data traffic (can be referred to as the primary forwarder) to the end device while other partner switches can simply discard the received multicast traffic. If the elected partner switch fails, another partner switch starts forwarding the traffic instead of discarding. In this way, the multi-chassis trunk provides high availability by forwarding data traffic with minimum interruption. Furthermore, when the failed device becomes active again, it obtains multicast states from the partner switch and rejoins the multicast distribution tree. The switch then resumes the role of the primary forwarder and notifies the partner switch.

In some embodiments, the same partner switches can couple multiple end devices via a plurality of multi-chassis trunks. During operation, these end devices join one or more multicast groups. Because a respective partner switch is coupled to a respective end device via the trunks, the switch can forward the corresponding multicast data traffic to any subset of the coupled end devices. Utilizing this feature, the data traffic can be load balanced among the partner switches via the links in the trunks. A network administrator can set a policy based upon which a respective partner switch forwards the data traffic to one or more end devices. Note that even when two end devices are receiving data from the same multicast group, the data traffic can be routed over different partner switches for load balancing. In a failure scenario, the allocated end devices of the failed device can be redistributed among the active partner switches. In this way, a respective end device continues to receive multicast traffic from the corresponding multi-chassis trunk with minimum interruption while the traffic load is balanced among the partner switches.

In some embodiments, the partner switches are member switches of a fabric switch. An end device can be coupled to the fabric switch via a multi-chassis trunk. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the end device.

Although the present disclosure is presented using examples based on the layer-3 multicast routing protocol, embodiments of the present invention are not limited to layer-3 networks. Embodiments of the present invention are relevant to any networking protocol which distributes multicast traffic. In this disclosure, the term "layer-3 network" is used in a generic sense, and can refer to any networking layer, sub-layer, or a combination of networking layers.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional switch, or any other type of network device. Additionally, an end device can be coupled to other switches or hosts further away from a network. An end device can also be an aggregation point for a number of switches to enter the network.

The term "switch identifier" refers to a group of bits that can be used to identify a switch. If a switch is an RBridge, the switch identifier can be referred to as an "RBridge identifier." Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term and is not limited to any bit format, and can refer to any format that can identify a switch. The term "RBridge identifier" is also used in a generic sense and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "network device" include, but not limited to, a layer-2 switch, a layer-3 router, or a TRILL RBridge.

The term "multicast management protocol" is used in a generic sense, and it can refer to any protocol that can be used by end devices and switches to establish multicast group memberships. Examples of such protocol include, but not limited to, Internet Group Management Protocol (IGMP) and Multicast Listener Discovery (MLD). The term "multicast distribution protocol" is also used in a generic sense, and it can refer to any protocol that can be used by switches to route multicast traffic. Examples of such protocol include, but not limited to, Protocol-Independent Multicast (PIM).

The term "Ethernet fabric switch" or "VCS" refers to a number of interconnected physical switches which form a single, scalable logical switch. In a fabric switch, any number of switches can be connected in an arbitrary topology and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary multi-chassis trunk, in accordance with an embodiment of the present invention. As illustrated in FIG. 1A, switches 102 and 104 are coupled to end device 110 (in this example, end device 110 is a layer-2 switch) via multi-chassis trunk 120. Trunk 120 includes link 122 coupling end device 110 to switch 102 and link 124 coupling end device 110 to switch 104. Switches 102 and 104 are coupled to each other via inter-chassis link 126. Links 122, 124, and 126 can be trunk links. Switches 102 and 104 are members of virtual local area network (VLAN) 150 and are coupled to network 132, which can be the Internet. Other network and end devices can be coupled to switches 102 and 104 via links 142 and 144, respectively.

During operation, an end device 112 (in this example, end device 112 is a host machine) sends a join request for a multicast group using a multicast management protocol (e.g., an IGMP join). End device 112 is coupled to end device 110 via one or more consecutive links 128 (denoted using dashed lines). One or more switches can couple a plurality of consecutive links. Upon receiving the request, end device 110 forwards the request via trunk 120. In some embodiments, end device 110 forwards the request via a designated primary link (e.g., link 122) of trunk 120. One of the switches, such as switch 102, receives the request via link 122. Switch 102 then forwards the join request to its partner switch 104 via inter-chassis links 126. As a result, though switches 102 and 104 are members of the same VLAN 150, these switches send a join message using a multicast distribution protocol (e.g., a PIM join) via network 132 to root router 134 of the multicast distribution tree. In some embodiments, the multicast distribution protocol is PIM and router 134 is the rendezvous point (RP). PIM is described in IETF RFC "Protocol Independent Multicast-Sparse Mode (PIM-SM): Protocol Specification (Revised)," available at http://tools.ietf.org/html/rfc4601, which is incorporated by reference herein. Switches 102 and 104 thus join the multicast distribution tree and start receiving multicast traffic for the group. Either switch 102 or 104 forwards the received multicast traffic to end device 110 while the other one discards the traffic. End device 110, in turn, forwards the traffic to end device 112.

Suppose that switch 102 forwards the multicast traffic to end device 110. If end device 110 becomes a member of a second multicast group, switch 104 can forward the corresponding multicast data flows for the second group. In this way, multicast data flows for different groups can be load-balanced among partner switches of a multi-chassis trunk. In further embodiments, both partner switches 102 and 104 can forward a part of the traffic to end device 110. As a result, the multicast traffic is load balanced among links 122 and 124 in trunk 120. A network administrator can configure switches 102 and 104 to forward a portion of their received traffic and discard the rest. The network administrator can also dynamically change the forwarding policy and dictate the portion of multicast traffic switches 102 and 104 forward.

Because both switches 102 and 104 receive multicast traffic from router 134 via network 132, these switches can provide high availability and fast recovery to end device 110 via trunk 120. In a failure scenario, the allocated traffic for the failed device can be redistributed among the active partner switches. For example, if switch 104 fails, switch 102 can readily forward the traffic to end device 110 via trunk 120 with minimum interruption.

Figure 1B:
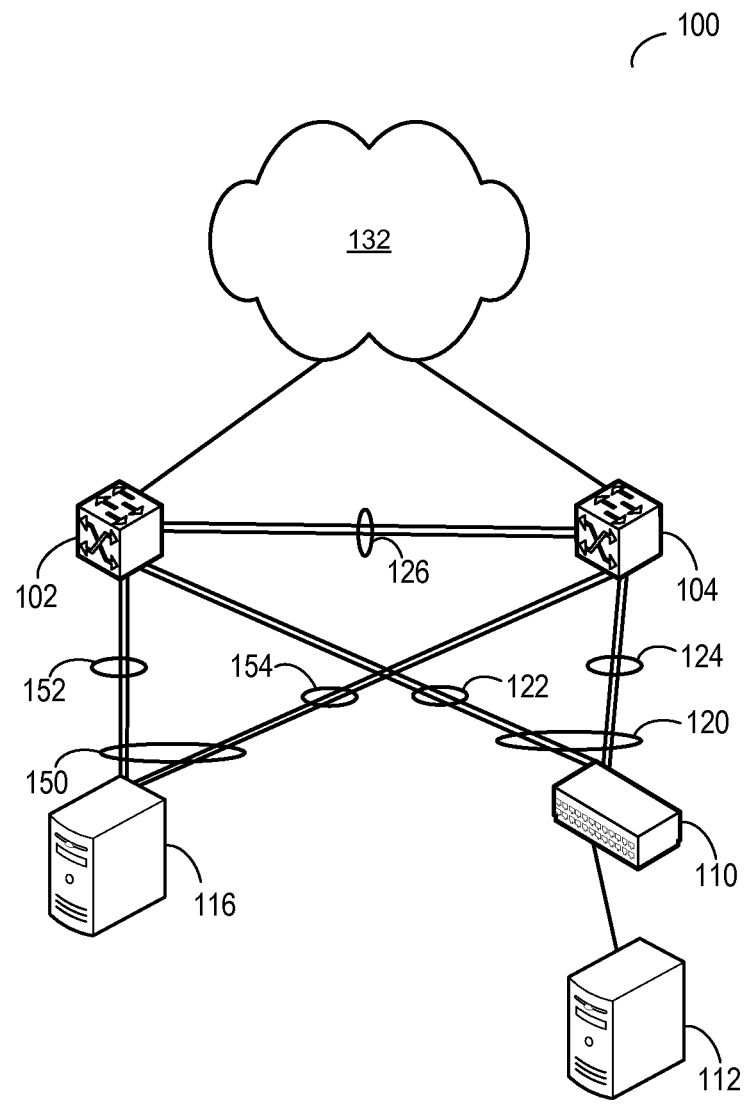
FIG. 1B illustrates a plurality of exemplary multi-chassis trunks coupled to the same partner switches, in accordance with an embodiment of the present invention.

In some embodiments, the same partner switches can couple multiple end devices via a plurality of multi-chassis trunks. FIG. 1B illustrates a plurality of exemplary multi-chassis trunks coupled to the same partner switches, in accordance with an embodiment of the present invention. Components in FIG. 1B are the same as in FIG. 1A, so the same numerals are used to denote them. In this example, switches 102 and 104 are also coupled to end device 116 (in this example, end device 116 is a host machine) via multi-chassis trunk 150. Trunk 150 includes link 152 coupling end device 116 to switch 102 and link 154 coupling end device 116 to switch 104. Links 152 and 156 can be trunk links as well.

During operation, end devices 112 and 116 join one or more multicast groups. Because switches 102 and 104 are coupled to end devices 112 (via end device 110) and 116 via trunks 120 and 150, respectively, switches 102 and 104 can forward the corresponding multicast data traffic to any subset of end devices 112 and 116. Utilizing this feature, the data traffic for the multicast groups can be load balanced among switches 102 and 104 via links 122, 124, 152, and 154. A network administrator can set a policy based upon which switches 102 and 104 forward data traffic to one or more of end devices 112 and 116. Note that even when end devices 112 and 116 are receiving data from the same multicast group, the data traffic can be routed over different partner switches for load balancing. For example, switches 102 and 104 can route data traffic for end devices 112 and 116, respectively. If switch 104 fails, switch 102 forwards data traffic to end device 116 as well. In this way, end device 116 continues to receive multicast traffic from multi-chassis trunk 150 with minimum interruption.

Forwarding Process

Figure 2A:
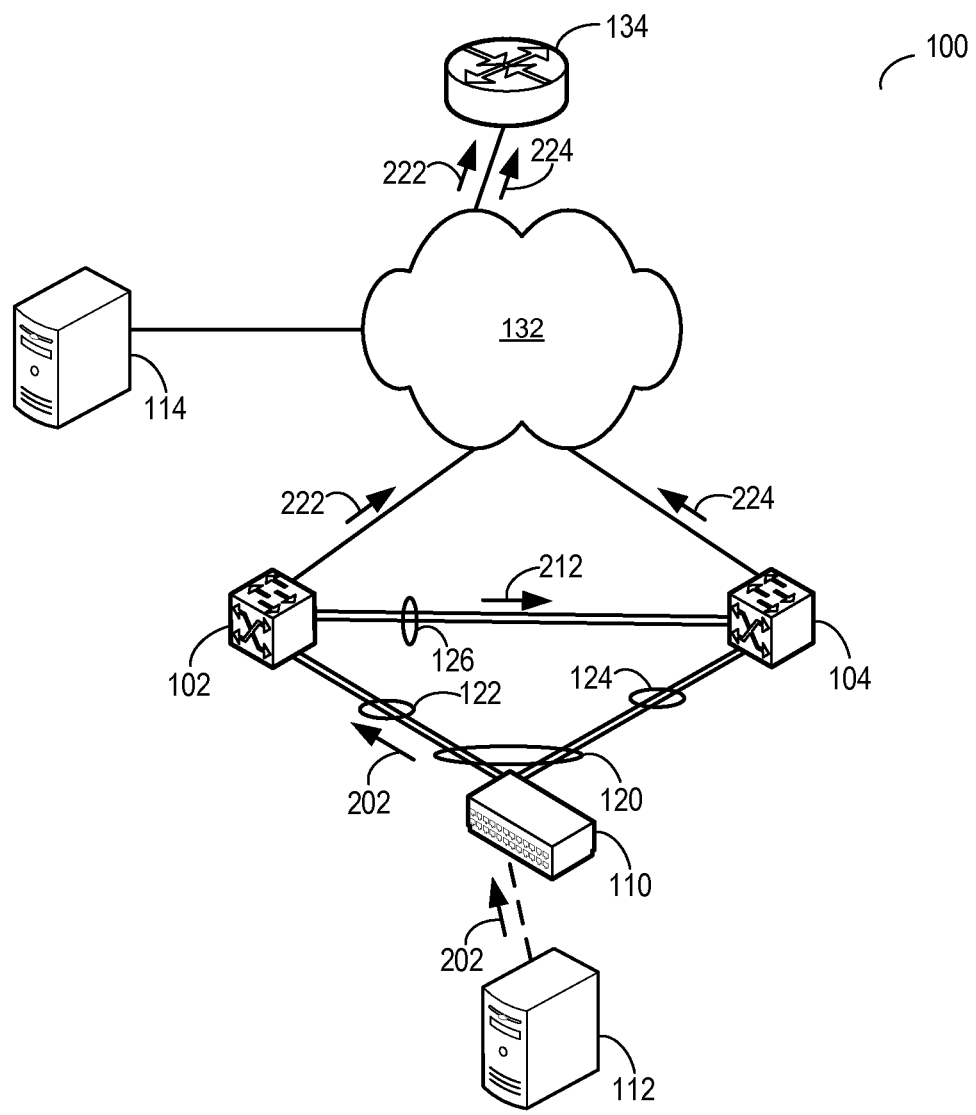
FIG. 2A illustrates an end device joining a multicast group via an exemplary multi-chassis trunk, in accordance with an embodiment of the present invention.

Though only one of switches 102 and 104 in FIG. 1 receives a join request for a multicast group from end device 110, the other switch also receives the join request from the partner switch. As a result, both switches 102 and 104 join the multicast group and become part of the multicast distribution tree. FIG. 2A illustrates an end device joining a multicast group via an exemplary multi-chassis trunk, in accordance with an embodiment of the present invention. Components in FIG. 2A are the same as in FIG. 1A, so the same numerals are used to denote them. During operation, end device 112 expresses its interest in receiving multicast traffic for a multicast group. Typically, end device expresses this interest by sending a join request 202 using a multicast management protocol (e.g., an IGMP join). End device 110 receives request 202 and forwards it to switch 102. In some embodiments, link 122 is the primary link of trunk 120.

Upon receiving join request 202, switch 102 encapsulates the request in a control message 212 and forwards message 212 to partner switch 104. Message 212 provides join request 202 to switch 104. Upon receiving joining request 202, switches 102 and 104 send join messages 222 and 224, respectively, of a multicast distribution protocol (e.g., a PIM join) toward root router 134 of the multicast distribution tree (e.g., RP) for the multicast group. Router 134 is typically coupled to a source node 114 of the multicast group via network 132. Join messages 222 and 224 travel via network 132 toward router 134. In some embodiments, in each router messages 222 and 224 pass through in network 132, a multicast tree state for the multicast group is instantiated. Eventually, messages 222 and 224 can either reach router 134 or reach a router in network 132 which is already part of the multicast distribution tree. Switches 102 and 104 can send messages 222 and 224 periodically as long as end device 112 remains in the group.

Figure 2B:
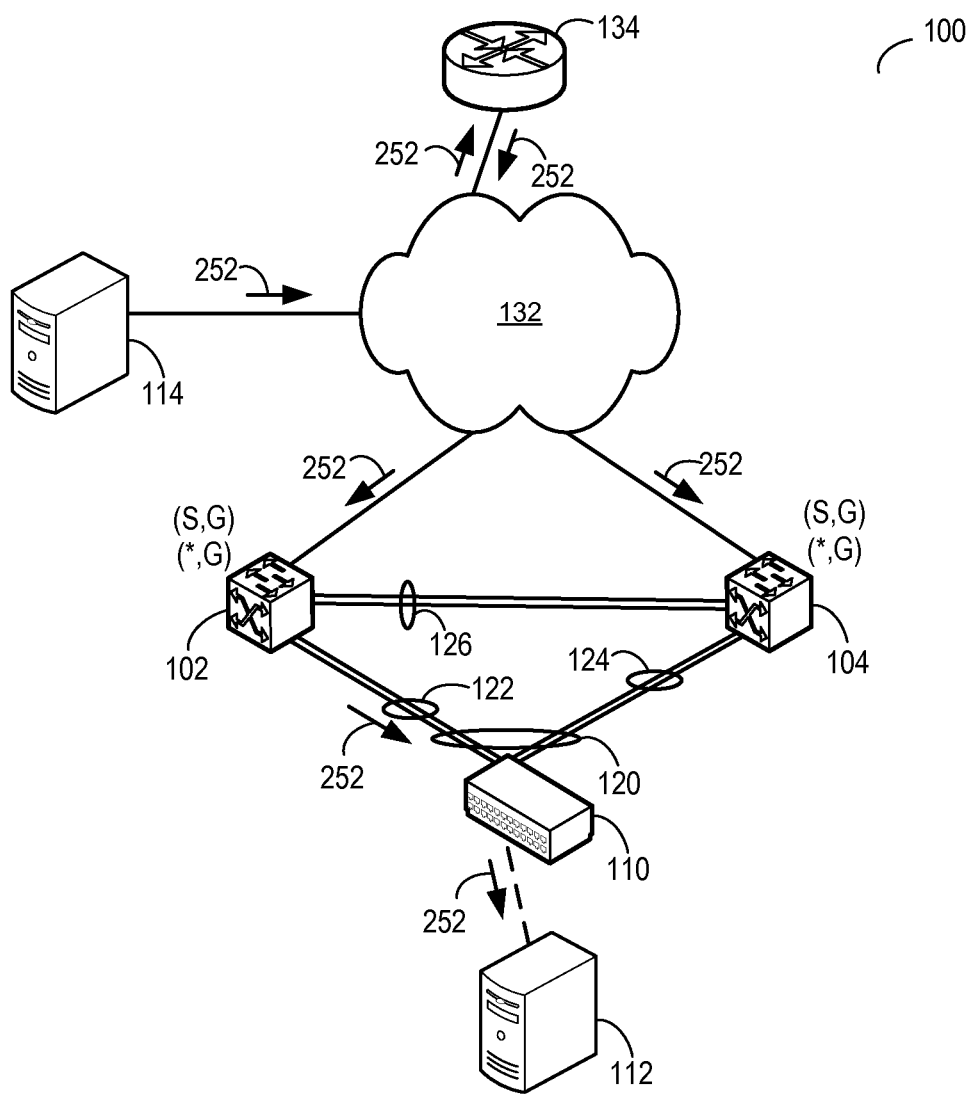
FIG. 2B illustrates an end device receiving multicast traffic via an exemplary multi-chassis trunk, in accordance with an embodiment of the present invention.

Upon receiving join messages 222 and 224, root router 134 starts forwarding data to switches 102 and 104 from sender 114. FIG. 2B illustrates an end device receiving multicast data traffic via an exemplary multi-chassis trunk, in accordance with an embodiment of the present invention. Components in FIG. 2B are the same as in FIG. 2A, so the same numerals are used to denote them. During operation, multicast data sender 114 just starts sending data traffic 252 destined for the corresponding multicast group. A local router in network 132 coupled to sender 114 receives data traffic 252 and sends data traffic 252 to root router 134 via unicast. Root router 134 receives data traffic 252 and forwards to the corresponding multicast distribution tree (e.g., the (*,G) multicast tree of PIM). Data traffic 252 then follows the multicast distribution tree in network 132.

Data traffic 252 is replicated wherever the multicast distribution tree branches, and reaches switches 102 and 104. Switches 102 and 104 elect a primary forwarder, which forwards data traffic 252 to end device 110 via trunk 120. In some embodiments, switches 102 and 104 can calculate a hash value for the multicast group and elect the primary forwarder based on the hash value. In some embodiments, the hash value can be calculated based on the multicast group address. Note that switches 102 and 104 can calculate the hash value and elect a primary forwarder when they receive join request 202 from end device 112, as described in conjunction with FIG. 2A. In the example in FIG. 2B, switch 102 is elected as the primary forwarder. As a result, switch 102 forwards data traffic 252 to end device 110, which in turn forwards data traffic 252 to end device 112. Switch 104 discards data traffic 252. If switch 102 fails, switch 104 starts forwarding data traffic 252 to end device 110 via trunk 120 without requiring joining the multicast distribution tree anew. In this way, high availability and fast recovery is provided for multicast routing via multi-chassis trunk 120. In some embodiments, sender 114 can have a better path to switches 102 and 104 than root router 134. Switches 102 and 104 then can join a source multicast tree rooted at sender 114 to optimize the multicast distribution path. The source multicast tree can be a (S, G) tree of PIM.

Figure 3:
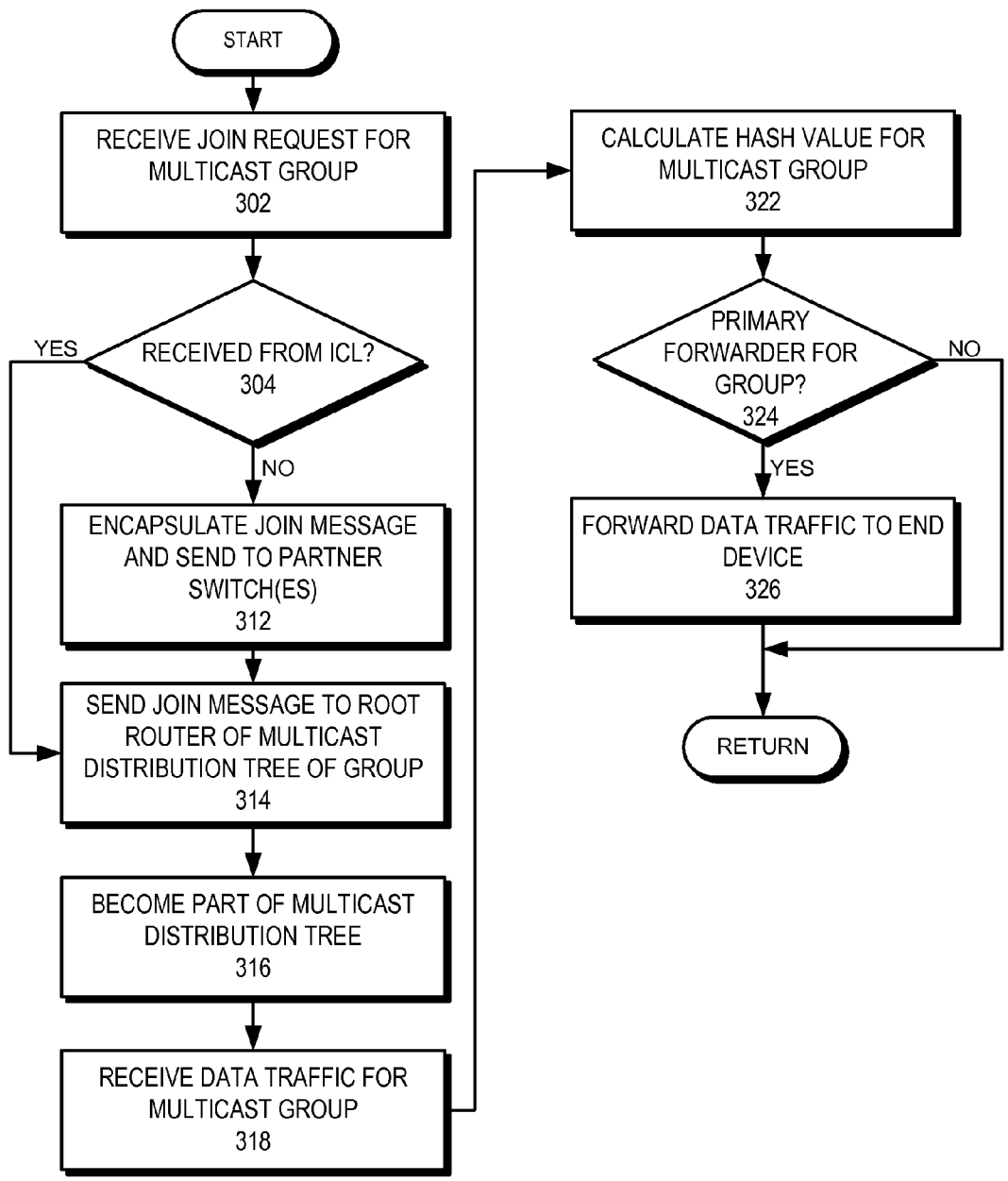
FIG. 3 presents a flowchart illustrating the process of a switch forwarding multicast traffic via a multi-chassis trunk, in accordance with an embodiment of the present invention.

FIG. 3 presents a flowchart illustrating the process of a switch forwarding multicast traffic via a multi-chassis trunk, in accordance with an embodiment of the present invention. The switch first receives a join request for a multicast group from an end device (operation 302). In some embodiments, the join request is an IGMP join. The switch then checks whether the join request is received from an inter-chassis link (operation 304). If so, the join request has been forwarded by a partner switch participating in the same inter-chassis trunk. If the join request is not received from an inter-chassis link, the join request has been forwarded by an end device. The switch then encapsulates the join request in a control message and sends the message to the partner switch(es) (operation 312). If the switch receives the join request from an inter-chassis link (operation 304) or the switch has forwarded the join request to other partner switch(es) (operation 312), the switch sends the join message to the root router of the multicast distribution tree of the multicast group (operation 314) and becomes part of the multicast distribution tree (operation 316). In some embodiments, the join message is a PIM join, the root router is an RP, and the multicast distribution tree is the (*,G) multicast tree of PIM.

After becoming part of the multicast group, the switch receives data traffic of the multicast group (operation 318). The switch then calculates a hash value for the multicast group (operation 322). In some embodiments, the switch calculates the hash value for the multicast group after receiving the join request (operation 302). Based on the calculated hash value, the switch determines whether the switch is the primary forwarder for the group (operation 324). In some embodiments, the hash value can be calculated based on the multicast group address. If the switch is the primary forwarder, the switch forwards the data traffic to the end device (operation 326).

High Availability

Figure 4A:
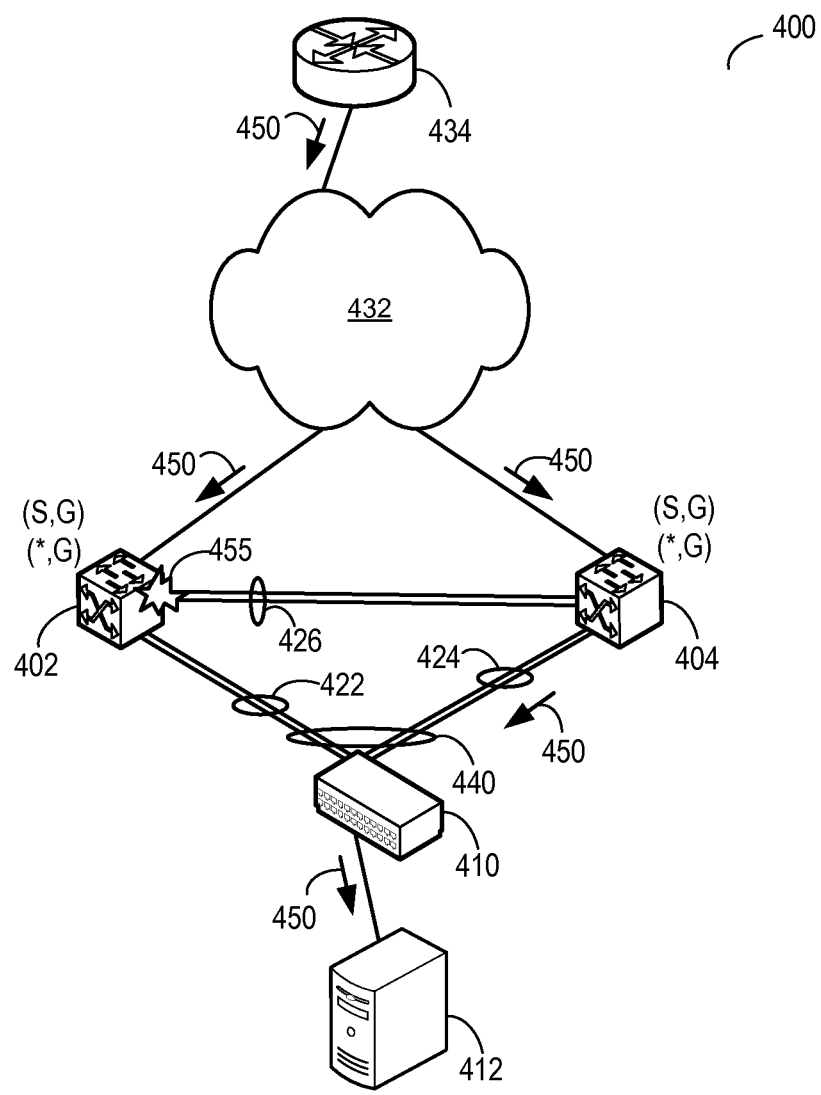
FIG. 4A illustrates an exemplary failure scenario in forwarding multicast traffic via a multi-chassis trunk, in accordance with an embodiment of the present invention.

High availability is provided to multicast traffic routed over a multi-chassis trunk by making a respective partner switch of the trunk part of the multicast distribution tree. During regular operation, only one partner switch forwards the multicast data traffic to an end device. However, if the switch fails, another partner switch can start sending data traffic to the end device without requiring joining the multicast distribution tree anew. FIG. 4A illustrates an exemplary failure scenario in while forwarding multicast traffic via a multi-chassis trunk, in accordance with an embodiment of the present invention. Switches 402 and 404 are coupled to end device 410 (in this example, end device 410 is a layer-2 switch) via multi-chassis trunk 440. Trunk 440 includes link 422 coupling end device 410 to switch 402 and link 424 coupling end device 410 to switch 404. Switches 402 and 404 are coupled to each other via inter-chassis link 426. Links 422, 424, and 426 can be trunk links. Switches 402 and 404 are coupled to network 432, which can be the Internet.

During operation, upon receiving a join request (e.g., an IGMP join) from an end device 412 via end device 410 and trunk 440, switches 402 and 404 send a join message (e.g., a PIM join) via network 432 to root router 434. As a result, switches 402 and 404 become part of the multicast distribution tree and start receiving multicast data traffic 450 for the group. Switch 402 forwards the received multicast traffic to end device 410 while switch 404 discards the traffic.

Because both switches 402 and 404 receive multicast traffic 450 from router 434 via network 432, switches 402 and 404 can provide high availability and fast recovery to end device 410 via trunk 440. Suppose that failure 455 occurs which fails switch 402. As a result, multicast data traffic 450 cannot route through switch 402. However, because switch 404 receives data traffic 450 simultaneously, switch 404 can readily start forwarding data traffic 450 to end device 410 via trunk 440 with minimum interruption. When switch 402 becomes active, it resumes acting as the primary forwarder.

Figure 4B:
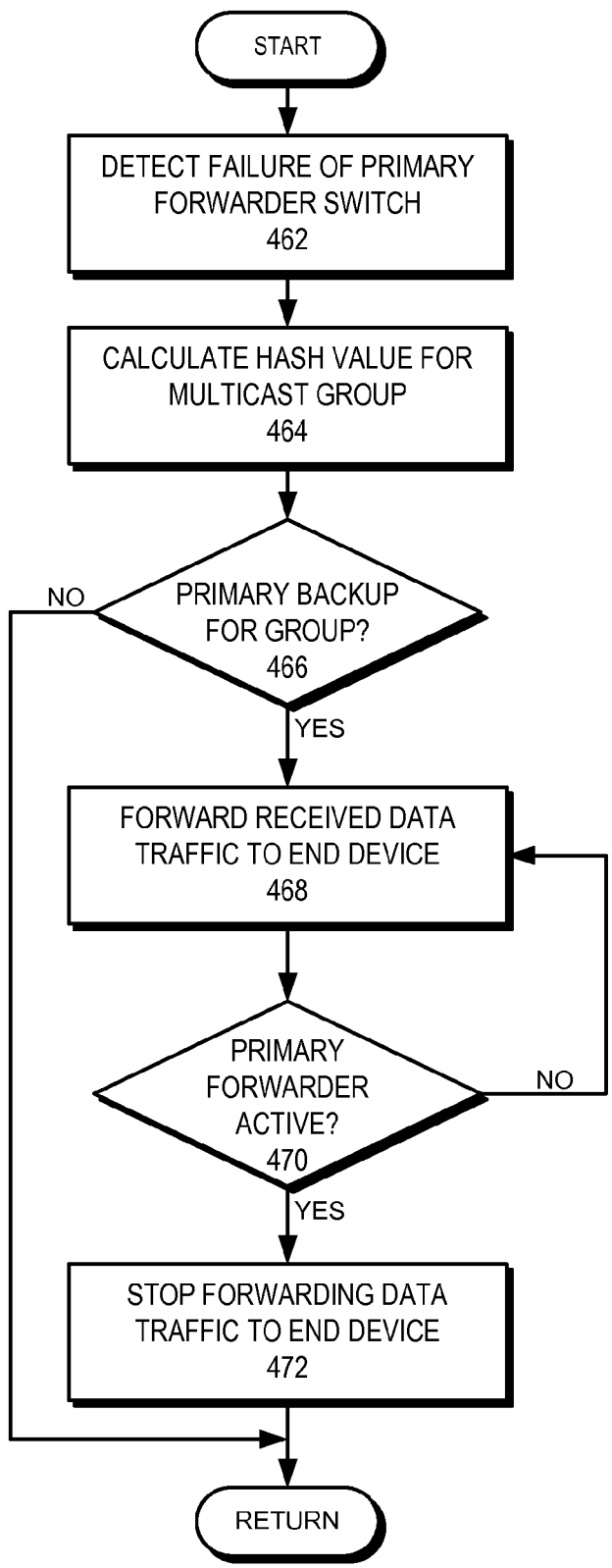
FIG. 4B presents a flowchart illustrating the process of a switch providing high availability while forwarding multicast traffic via a multi-chassis trunk, in accordance with an embodiment of the present invention.

FIG. 4B presents a flowchart illustrating the process of a switch providing high availability while forwarding multicast traffic via a multi-chassis trunk, in accordance with an embodiment of the present invention. The switch first detects a failure of the primary forwarder switch (operation 462). In some embodiments, the switch detects the failure from an inter-chassis link. The switch then calculates a hash value for the multicast group (operation 464) and checks whether the switch is the primary backup switch for the multicast group (operation 466). Note that if the number of switches in the multi-chassis trunk is two, operation 466 is not required because the active switch is the primary backup switch by default.

If the switch is the primary backup switch for the multicast group, the switch forwards the received multicast data traffic to the end device coupled to the switch via the multi-chassis trunk (operation 468). Otherwise, the switch does not change its current forwarding policy. The switch then checks whether the primary forwarder has become active (operation 470). If not, the switch continues to forward data traffic to the end device (operation 468). If the primary forwarder becomes active, the switch stops forwarding data traffic to the end device (operation 472). Whenever the primary forwarder switch becomes active, it resumes the responsibility of forwarding the data traffic to the end device.

Use Cases

Figure 5A:
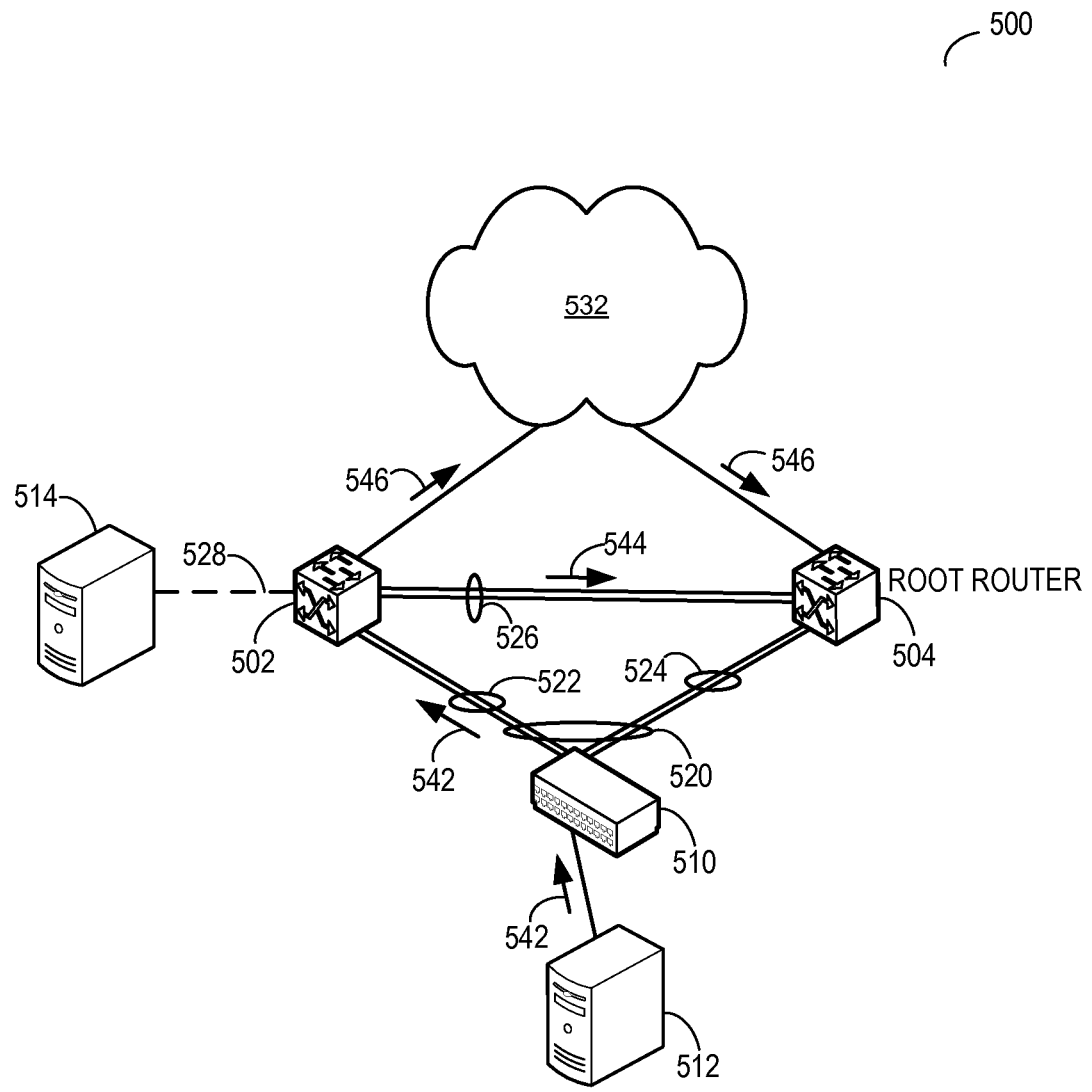
FIG. 5A illustrates an end device joining a multicast group via an exemplary multi-chassis trunk comprising a root switch, in accordance with an embodiment of the present invention.

Partner switches in a multi-chassis trunk can also be a root router of a multicast distribution tree. FIG. 5A illustrates an end device joining a multicast group via an exemplary multi-chassis trunk comprising a root router, in accordance with an embodiment of the present invention. Switches 502 and 504 are coupled to end device 510 (in this example, end device 510 is a layer-2 switch) via multi-chassis trunk 520. Trunk 520 includes link 522 coupling end device 510 to switch 502 and link 524 coupling end device 510 to switch 504. Switches 502 and 504 are coupled to each other via inter-chassis link 526. Links 522, 524, and 526 can be trunk links. Switches 502 and 504 are coupled to network 432, which can be the Internet. In the example in FIG. 5A, switch 504 is also a root router for a multicast group and switch 502 is coupled to sender 514 of the group via one or more consecutive links 528 (denoted using dashed lines). One or more switches can couple a plurality of consecutive links.

During operation, an end device 512 (in this example, end device 412 is a host machine) sends join request 542 for the multicast group using a multicast management protocol (e.g., an IGMP join). End device 510 receives request 542 and forwards it to switch 502 via the primary link 522 of trunk 520. Upon receiving join request 542, switch 502 encapsulates the request in a control message 544 and forwards message 544 to partner switch 504. Upon receiving join request 542, switch 504 realizes that the root switch is also in participating in multi-cassis trunk 520. Switch 502 sends join message 546 (e.g., a PIM join) toward root router 504 of the multicast distribution tree (e.g., RP) for the multicast group via network 532. Note that inter-chassis links 526 are typically configured for control messages and multicast traffic. Switch 502 typically uses local routing table and forwarding information base to forward multicast join message 546. As a result, switch 502 uses network 532 for forwarding message 546 to switch 504 instead of inter-chassis links 526.

Figure 5B:
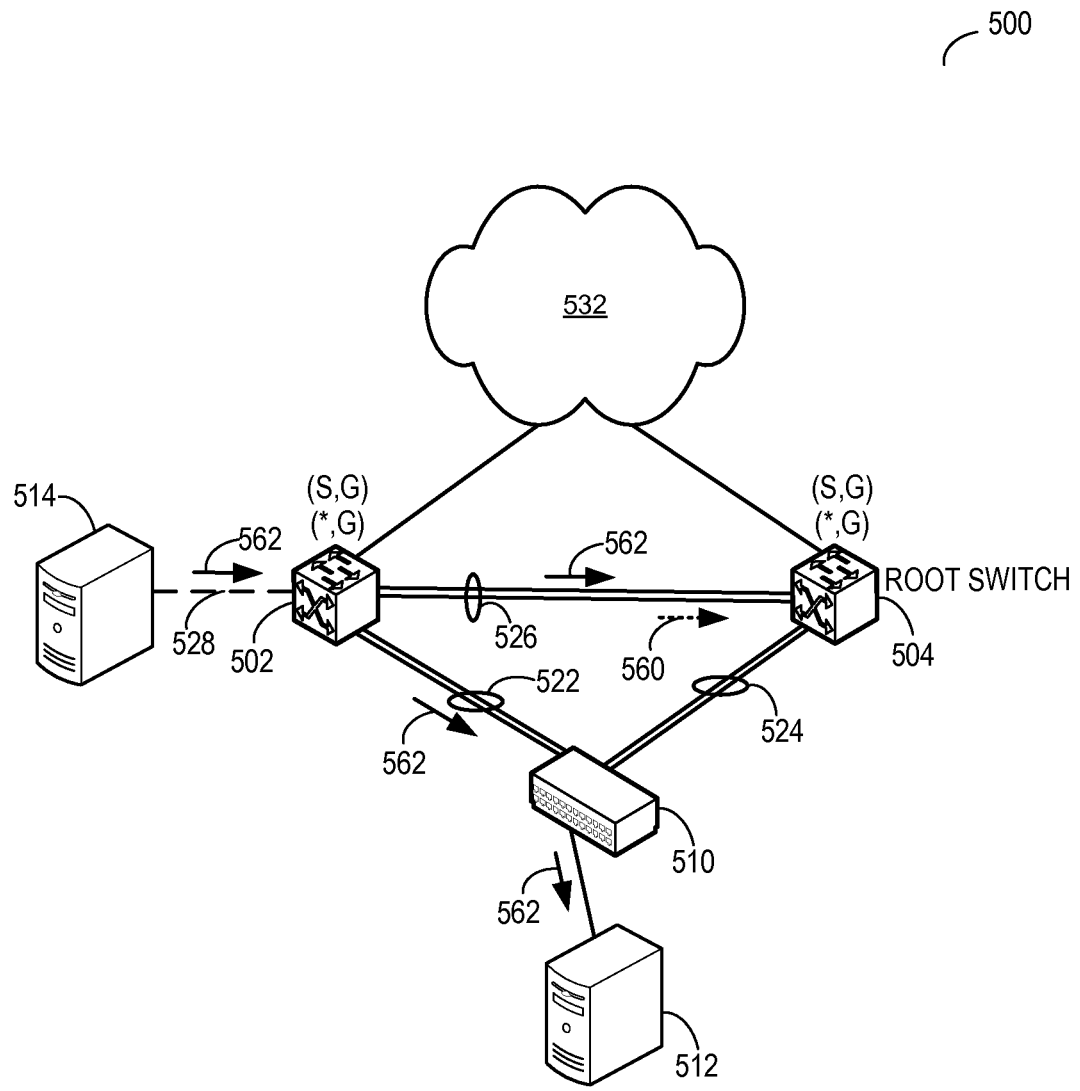
FIG. 5B illustrates an end device receiving multicast traffic via an exemplary multi-chassis trunk comprising a root switch, in accordance with an embodiment of the present invention.

FIG. 5B illustrates an end device receiving multicast traffic via an exemplary multi-chassis trunk comprising a root switch, in accordance with an embodiment of the present invention. Components in FIG. 5B are the same as in FIG. 5A, so the same numerals are used to denote them. During operation, multicast data sender 514 just starts sending multicast data traffic 562 destined for the multicast group. In this example, switch 502 is the primary forwarder for data traffic 562, and the path from sender 514 to switch 504 (i.e., the root router) is via primary forwarder switch 502. Consequently, a source multicast distribution tree rooted at sender 514 can have a better path to switch 502 than a multicast distribution tree rooted at switch 504. Hence, switch 502 joins the source multicast distribution tree rooted at sender 514. The source multicast distribution tree can be a (S, G) tree of PIM.

Switch 502 synchronizes this updated state with partner switch 504 by sending a multicast distribution protocol (e.g., PIM) state synchronization message 560. Switch 504, in turn, also becomes a member of the source multicast distribution tree. Data traffic 562 is replicated wherever the source multicast distribution tree branches. Data traffic 562 reaches switch 502 via links 528 and switch 504 via inter-chassis links 526. Switch 502 forwards data traffic 562 to end device 510, which in turn forwards data traffic 562 to end device 512. Switch 504, as the root router, forwards data traffic 562 to any other switch via network 532.

Figure 6:
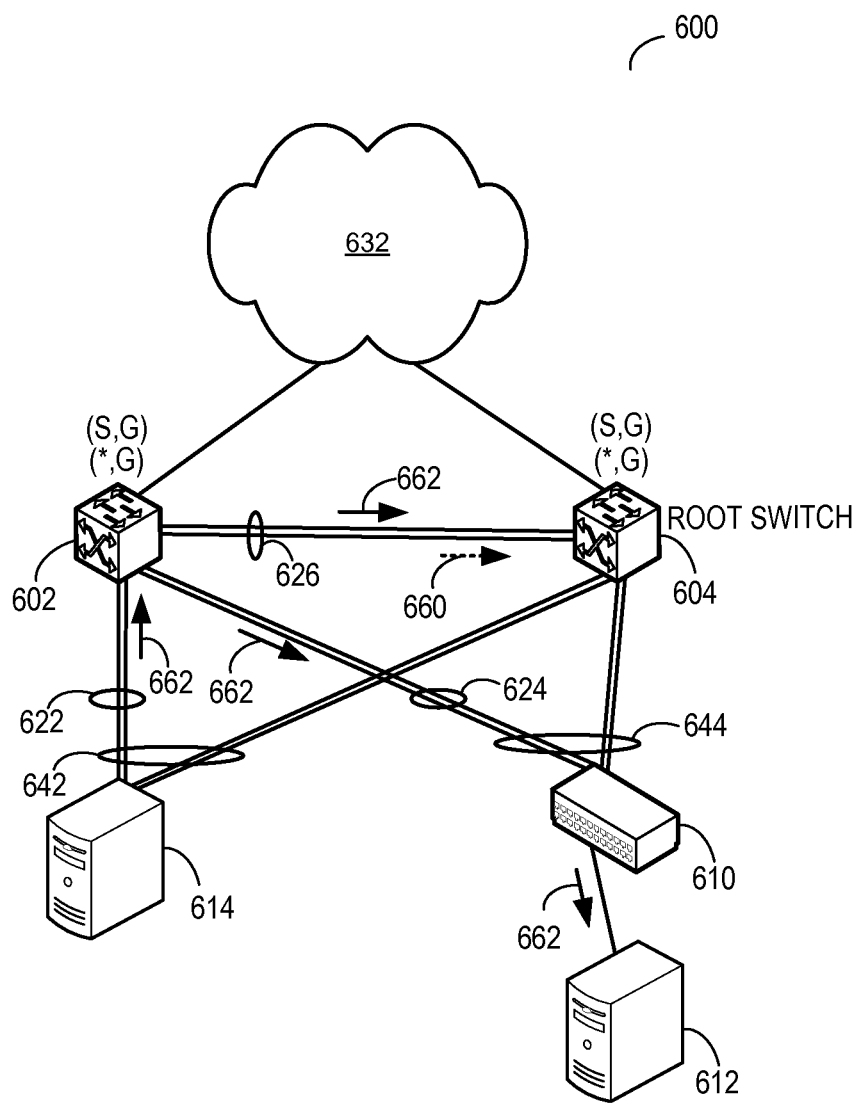
FIG. 6 illustrates an exemplary scenario with the sender and the receiver of multicast traffic behind a multi-chassis trunk comprising a root switch, in accordance with an embodiment of the present invention.

In some embodiments, the sender and receiver of multicast data traffic can be coupled to multi-chassis trunks. FIG. 6 illustrates an exemplary scenario with the sender and the receiver of multicast traffic behind a multi-chassis trunk comprising a root switch, in accordance with an embodiment of the present invention. Switches 602 and 604 are coupled to end device 610 (in this example, end device 610 is a layer-2 switch) via multi-chassis trunk 644 and sender 614 via multi-chassis trunk 642. Switches 602 and 604 are coupled to network 432, which can be the Internet. In the example in FIG. 6, switch 604 is also the root router for the corresponding multicast group.

During operation, multicast data sender 614 starts sending multicast data traffic 662 destined for the multicast group. In this example, switch 602 is the primary forwarder for data traffic 662 and sender 614 is directly coupled to switch 602. A path to switch 602 from sender 614 is better than a path via root router 604. Consequently, a source multicast distribution tree rooted at sender 614 can be better than a multicast distribution tree rooted at switch 604. Hence, switch 602 joins the source multicast distribution tree rooted at sender 614. The source multicast distribution tree can be a (S, G) tree of PIM.

Switch 602 synchronizes this updated state with partner switch 604 by sending a multicast distribution protocol (e.g., PIM) state synchronization message 660. Switch 604, in turn, also becomes a member of the source multicast distribution tree. Data traffic 662 is replicated wherever the source multicast distribution tree branches. Data traffic 662 reaches switch 602 via link 622 of trunk link 642. Note that because switches 602 and 604 appear to sender 614 as a single switch coupled via trunk 642, sender 614 are not aware of to which switch (between switches 602 and 604) it is sending data traffic 662. As a result, data traffic 662 may reach switch 604 via inter-chassis links 626 instead of trunk 642. Switch 602 forwards data traffic 662 to end device 610 via links 624. End device 610, in turn, forwards data traffic 662 to end device 612. Switch 604, as the root router, can forward data traffic 662 to any other network device coupled via network 632.

Exemplary Switch System

Figure 7:
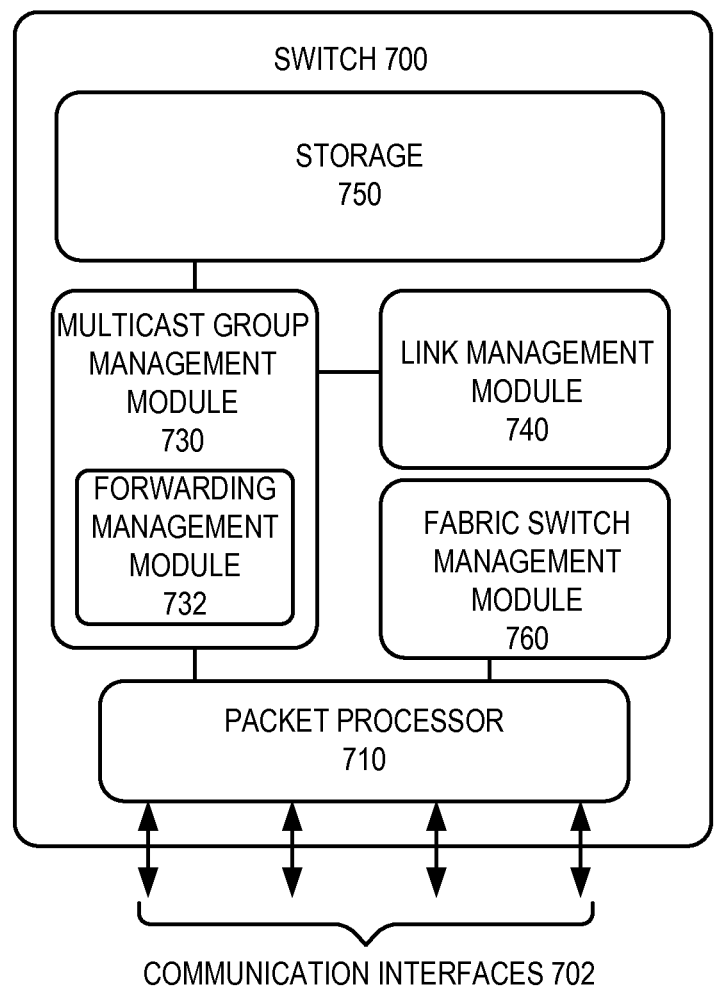
FIG. 7 illustrates an exemplary architecture of a switch, in accordance with an embodiment of the present invention.

FIG. 7 illustrates an exemplary switch, in accordance with an embodiment of the present invention. In this example, a switch 700 includes a number of communication interfaces 702, a multicast management module 730, a packet processor 710, a link management module 740, and a storage 750. Multicast management module 730 includes a forwarding module 732. Packet processor 710 extracts and processes header information from the received frames.

In some embodiments, switch 700 may maintain a membership in a fabric switch, wherein switch 700 also includes a fabric switch management module 760. Fabric switch management module 760 maintains a configuration database in storage 750 that maintains the configuration state of every switch within the fabric switch. Fabric switch management module 760 maintains the state of the fabric switch, which is used to join other switches. In some embodiments, switch 700 can be configured to operate in conjunction with a remote switch as a logical Ethernet switch. Under such a scenario, communication interfaces 702 can include inter-switch communication channels for communication within a fabric switch. This inter-switch communication channel can be implemented via a regular communication port and based on any open or proprietary format. Communication interfaces 702 can include one or more TRILL interfaces capable of receiving frames encapsulated in a TRILL header. Packet processor 710 can process these frames.

Link management module 732 operates at least one of communication interfaces 702 in conjunction with a remote switch to form a multi-chassis trunk link. During operation, switch 700 receives a control message from the remote switch. Packet processor 710 extracts a join request packet for a multicast group from the control message. Multicast group management module 730 operates in conjunction with packet processor 700. Upon receiving the join request, packet processor 710 and multicast group management module 730 construct a join packet (e.g., an IGMP join) for receiving data traffic associated with the multicast group. After joining the multicast group, switch 700 builds corresponding control plane states based on the join. If the multicast routing protocol permits, switch 700 initiates the upstream join (e.g., a PIM join) to obtain traffic from an upstream network device (e.g., an RP). Multicast group management module 730 in conjunction with packet processor 710 shares the multicast group membership information (e.g., IGMP/MLD group membership) with all partner switches upon establishing the control state. Switch 700 then starts receiving multicast data packets. Multicast group management module 730 in conjunction with packet processor 710 extracts multicast data associated with the multicast group from the received packets.

Forwarding management module 732 determines whether the switch is a primary forwarder for the multicast group. In some embodiments, forwarding management module 732 determines whether the switch is the primary forwarder based on a hash value calculated using an identifier (e.g., a layer-3 address) of the multicast group. If the switch is not a primary forwarder, forwarding management module 732 precludes the local interface in the multi-chassis trunk from forwarding multicast data associated with the multicast group. If the remote switch fails and the remote switch is the primary forwarder, link management module 740 detects the failure. After detecting the failure, forwarding management module 732 instructs the local interface in the multi-chassis trunk to start forwarding multicast data associated with the multicast group.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch, a method and a system for routing multicast traffic over a multi-chassis trunk. In one embodiment, the switch includes a link management module, a packet processor, a forwarding management module, and a multicast group management module. The link management module operates a local interface of the switch in conjunction with a remote switch to form a multi-chassis trunk link. The packet processor extracts a join request packet for a multicast group from a control message from the remote switch. The forwarding management module determines whether the switch is a primary forwarder for the multicast group. The multicast group management module operates in conjunction with the packet processor to construct a join packet for receiving data traffic associated with the multicast group.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
 a link management module adapted to operate a local interface of the switch in conjunction with a remote switch to form a multi-chassis trunk link, wherein the multi-chassis trunk link is coupled to the switch and the remote switch;
a packet processor adapted to identify a join request from an end device coupled to the multi-chassis trunk link for joining a multicast group, wherein the join request is encapsulated in a control message received from the remote switch;
a forwarding management module adapted to:
  determine whether the switch is a primary forwarder for the multicast group;
  preclude the local interface from forwarding multicast data associated with the multicast group to the end device in response to the switch not being the primary forwarder; and
  instruct the local interface to forward multicast data associated with the multicast group in response to detecting a failure of the remote switch.

2. The switch of claim 1, further comprising a multicast group management module adapted to extract multicast data associated with the multicast group from a received packet.

3. The switch of claim 1, further comprising a multicast group management module is further adapted to construct a control message for the remote switch comprising local multicast state information of the switch.

4. The switch of claim 1, wherein the forwarding management module determines whether the switch is the primary forwarder based on a hash value calculated using an identifier of the multicast group.

5. The switch of claim 1, further comprising a multicast group management module adapted to construct a join packet for joining a multicast distribution tree of the multicast group based on the identified join request.

6. The switch of claim 1, wherein the switch and the remote switch are members of an Ethernet fabric switch, wherein the Ethernet fabric switch operates as a single Ethernet switch; and
  wherein the switch and the remote switch are associated with a fabric identifier of the Ethernet fabric switch.

7. The switch of claim 1, wherein the packet processor is further adapted to extract packets encapsulated in a Transparent Interconnection of Lots of Links (TRILL) header.

8. A computer-executable method, comprising:
  operating a local interface of a switch in conjunction with a remote switch to form a multi-chassis trunk link, wherein the multi-chassis trunk link is coupled to the switch and the remote switch;
  identifying a join request from an end device coupled to the multi-chassis trunk link for joining a multicast group, wherein the join request is encapsulated in a control message received from the remote switch;
  determining whether the switch is a primary forwarder for the multicast group;
  precluding the local interface from forwarding multicast data associated with the multicast group to the end device in response to the switch not being the primary forwarder; and
  instructing the local interface to forward multicast data associated with the multicast group in response to detecting a failure of the remote switch.

9. The method of claim 8, further comprising extracting multicast data associated with the multicast group from a received packet.

10. The method of claim 8, further comprising constructing a control message for the remote switch comprising local multicast state information of the switch.

11. The method of claim 8, wherein whether the switch is the primary forwarder is determined based on a hash value calculated using an identifier of the multicast group.

12. The method of claim 8, further comprising constructing a join packet for joining a multicast distribution tree of the multicast group based on the identified join request.

13. The method of claim 8, wherein the switch and the remote switch are members of an Ethernet fabric switch, wherein the Ethernet fabric switch operates as a single Ethernet switch; and
  wherein the switch and the remote switch are associated with a fabric identifier of the Ethernet fabric switch.

14. The method of claim 8, further comprising extracting packets encapsulated in a Transparent Interconnection of Lots of Links (TRILL) header.

15. A computing system, comprising:
  a processor; and
  a non-transitory computer-readable storage medium storing instructions that when executed by the processor cause the computing system to perform a method for supporting multicast routing over a multi-chassis trunk, the method comprising:
    operating a local interface of the computing system in conjunction with a remote computing system to form a multi-chassis trunk link, wherein the multi-chassis trunk link is coupled to the computing system and the remote computing system;
    identifying a join request for joining a multicast group from an end device coupled to the multi-chassis trunk link, wherein the join request is encapsulated in a control message received from the remote computing system;
    determining whether the computing system is a primary forwarder for the multicast group;
    precluding the local interface from forwarding multicast data associated with the multicast group to the end device in response to the computing system not being the primary forwarder; and
    instructing the local interface to forward multicast data associated with the multicast group in response to detecting a failure of the remote computing system.

16. The computing system of claim 15, wherein the method further comprises extracting multicast data associated with the multicast group from a received packet.

17. The computing system of claim 15, wherein the method further comprises constructing a control message for the remote computing system comprising local multicast state information of the computing system.

18. The computing system of claim 15, wherein whether the computing system is the primary forwarder is determined based on a hash value calculated using an identifier of the multicast group.

19. The computing system of claim 15, wherein the method further comprises constructing a join packet for joining a multicast distribution tree of the multicast group based on the identified join request.

20. The computing system of claim 15, wherein the computing system and the remote computing system are members of an Ethernet fabric switch, wherein the Ethernet fabric switch operates as a single Ethernet switch; and
  wherein the computing system and the remote computing system are associated with a fabric identifier of the Ethernet fabric switch.

21. The computing system of claim 15, wherein the method further comprises extracting packets encapsulated in a Transparent Interconnection of Lots of Links (TRILL) header.

* * * * *